(12) United States Patent
Ryner

(10) Patent No.: US 11,288,491 B2
(45) Date of Patent: Mar. 29, 2022

(54) METHOD FOR AUTOMATED UNSUPERVISED ONTOLOGICAL INVESTIGATION OF STRUCTURAL APPEARANCES IN ELECTRON MICROGRAPHS

(71) Applicant: Intelligent Virus Imaging Inc., Southern Pines, NC (US)

(72) Inventor: Martin Ryner, Huddinge (SE)

(73) Assignee: INTELLIGENT VIRUS IMAGING INC, Southern Pines, NC (US)

( * ) Notice: Subject to any disclaimer, the term of this patent is extended or adjusted under 35 U.S.C. 154(b) by 542 days.

(21) Appl. No.: 16/326,359

(22) PCT Filed: Jul. 2, 2018

(86) PCT No.: PCT/US2018/040625

§ 371 (c)(1),
(2) Date: Feb. 18, 2019

(87) PCT Pub. No.: WO2019/022925

PCT Pub. Date: Jan. 31, 2019

(65) Prior Publication Data

US 2021/0286969 A1    Sep. 16, 2021

Related U.S. Application Data

(60) Provisional application No. 62/535,851, filed on Jul. 22, 2017.

(51) Int. Cl.
*G06K 9/00* (2006.01)
*G06K 9/46* (2006.01)
(Continued)

(52) U.S. Cl.
CPC ....... *G06K 9/0014* (2013.01); *G06K 9/00127* (2013.01); *G06K 9/4661* (2013.01); *G06K 9/6202* (2013.01); *G02B 21/361* (2013.01)

(58) Field of Classification Search
CPC ............ G06K 9/0014; G06K 9/00127; G06K 9/6202; G06K 9/4661; G02B 21/361
(Continued)

(56) References Cited

U.S. PATENT DOCUMENTS

| 2008/0212880 A1* | 9/2008 | Homman | G06K 9/0014 |
| | | | 382/209 |
| 2010/0246927 A1* | 9/2010 | Arbuckle | G02B 21/361 |
| | | | 382/133 |

(Continued)

OTHER PUBLICATIONS

Kylberg et al., "Local intensity and PCA based detection of virus particle candidates in transmission electron microscopy images," 2009 Proceedings of 6th International Symposium on Image and Signal Processing and Analysis, 2009, pp. 426-431, doi: 10.1109/ISPA.2009.5297708. (Year: 2009).*

*Primary Examiner* — Nay A Maung
*Assistant Examiner* — Daniella M. DiGuglielmo
(74) *Attorney, Agent, or Firm* — Rolf Fasth; Fasth Law Offices

(57) ABSTRACT

The method is for dividing dark objects, sub-structures and background of an image from an electron microscope into segments by analyzing pixel values. The segments are transformed and aligned so that the transformed objects, sub-structures and background are meaningfully comparable. The transformed segments are clustered into classes which are used for ontological investigation of samples that are visualized by using electron microscopy. A triangle inequality comparison can be used to further cluster groups of objects to transfer understanding from different interactions between objects and to associate interactions with each other.

6 Claims, 10 Drawing Sheets

(51) Int. Cl.
 *G06K 9/62* (2006.01)
 *G02B 21/36* (2006.01)
(58) Field of Classification Search
 USPC .......................................................... 382/133
 See application file for complete search history.

(56) References Cited

U.S. PATENT DOCUMENTS

| | | | |
|---|---|---|---|
| 2011/0267507 A1 | 11/2011 | Kane et al. | |
| 2014/0286562 A1* | 9/2014 | Chen .................... | G06K 9/0014 382/133 |
| 2016/0063308 A1* | 3/2016 | Pauly ................... | G06K 9/6212 382/128 |

* cited by examiner

METHOD FOR AUTOMATED UNSUPERVISED ONTOLOGICAL INVESTIGATION OF STRUCTURAL APPEARANCES IN ELECTRON MICROGRAPHS

PRIOR APPLICATION

This application is a U.S. national phase application based on International Application No. PCT/US2018/040625, filed 2 Jul. 2018, claiming priority from U.S. Provisional Patent Application No. 62/535,851, filed 22 Jul. 2017.

TECHNICAL FIELD

The invention relates to a method for automated unsupervised ontological investigation of structural appearances, such as organic and inorganic materials, in electron micrographs.

BACKGROUND AND SUMMARY OF THE INVENTION

Many efforts have been made in the past to identify, classify and analyze cell structures that include viruses and other components. Various image analysis methods have been developed to describe, segment and classify viruses by using available image technologies. Normally, the user decides beforehand what it is the user is going to search for under the microscope and at what magnification. Various detection methods have been developed in the past that are adapted to identify, measure, etc. what the user is looking for. When specific and predetermined detection methods are used, it is easy to miss important information in the image that are not detected by the specific detection methods. Also, manual identification and analysis processes are difficult to carry out in a consistent way to ensure a certain quality level. In the past, it has been difficult to objectively, repeatedly and reliably identify, classify and characterize objects captured in microscopy images. Prior identification and classification processes of viral particles have been heavily user-biased and cumbersome to use because the prior art methods require the user to make decisions regarding how to segment images and what scales/magnification of the microscopy should be used. Structured artificial intelligent methods that use fixed filter banks, such as state of the art convolutional neural networks, often struggle with natural alignment challenges which makes the information resolution coarser than what is optimally achievable. Prior art solutions rely on big data sources to try to compensate for the coarseness but, as a consequence, they are often ineffective and time consuming to use for extracting new knowledge.

There is a need for a better and a more reliable way of investigating objects, such as virus particles, that is automatic but still flexible enough to handle the great diversity of biological objects and samples.

The method of the present invention provides a solution to the above-outlined problems. More particularly, the method is designed for automated ontological grouping of objects. A digital camera takes a picture or photo of an image in an electron microscope. The picture or photo is stored as a digital image in a computer or CPU. Many pictures may also be taken. At a first magnification scale, the computer automatically identifies objects in the digital image by comparing brightness of pixels in the digital image. The computer determines a degree of association between each pixel based on the brightness of each pixel. The computer forms a first segment around a first identified object and a second segment around a second identified object in the image separated where the pixels have a lowest association to one another. The computer mathematically transforms the first identified object to a first transformed object in a first transformed segment and the second identified object to a second transformed object in a second transformed segment wherein the transformed first and second objects have shapes with a fixed orientation. Based on the brightness of the pixels, the computer determines a first topology of the first transformed object. The computer compares brightness of pixels in the first transformed segment with brightness of pixels in the second transformed segment.

In a second embodiment of the present invention, the computer, at a second magnification scale, the second magnification scale being at a higher magnification than the first magnification scale, automatically identifies sub-structures in the digital image by comparing brightness of pixels in the digital image. The computer determines a degree of association between each pixel based on the brightness of each pixel. The computer forms a first sub-structure segment around a first identified sub-structure and a second sub-structure segment around a second identified sub-structure in the digital image separated where the pixels have a lowest association to one another. The computer mathematically transforms the first identified sub-structure to a first transformed sub-structure in a first transformed sub-structure segment and the second identified sub-structure to a second transformed sub-structure in a second transformed sub-structure segment wherein the transformed first and second sub-structures have shapes with a fixed orientation. Based on the brightness of the pixels, the computer determines a second topology of the transformed first sub-structure. The computer compares brightness of pixels in the first transformed sub-structure segment with brightness of pixels in the second transformed sub-structure segment.

In an alternative embodiment, the computer determines a first topology of the second transformed object and determines a second topology of the second transformed sub-structure. Based on the topologies, the computer assigns coordinates to the first transformed object and the second transformed objects so that the first transformed object and the second transformed object are in proximity in a perceptual space and assigns coordinates to the first transformed sub-structure and the second transformed sub-structure so that the first transformed sub-structure and the second transformed sub-structure are in proximity in the perceptual space but remote from the first and second transformed objects.

In yet an alternative embodiment, the computer identifies a third object and forms a third segment around the third object. The computer determines that the first segment and the first sub-structure segment have a pixel in common and that the second segment and the second sub-structure have a pixel in common. The computer determines that the third segment has no pixel in common with a sub-structure. The computer assigns coordinates to the first and second segments so that the first and second segments are closer to one another in the perceptual space than the third segment is to the first and second segments.

In another embodiment, the computer identifies objects at the first magnification scale simultaneously with identifying sub-structures at the second magnification scale.

In yet another embodiment, the computer identifies the third object in a second digital image from a second photo that is different from the digital image.

DETAILED DESCRIPTION

In general, the present invention is a method for (1) dividing dark data, in this case images of various types of organic or inorganic materials from electron microscopy images into meaningful segments, (2) aligning the segments so that they are meaningfully comparable, and (3) clustering the segments into classes which can be used for ontological investigation of samples that are visualized by using electron microscopy. One important aspect of the present invention is that the structural information in the image is divided into connected subsets with its own alignment fields based on the data itself and not on any fixed or predetermined structure or fixed filters which is the case for most state of the prior art methods.

Figure 1:
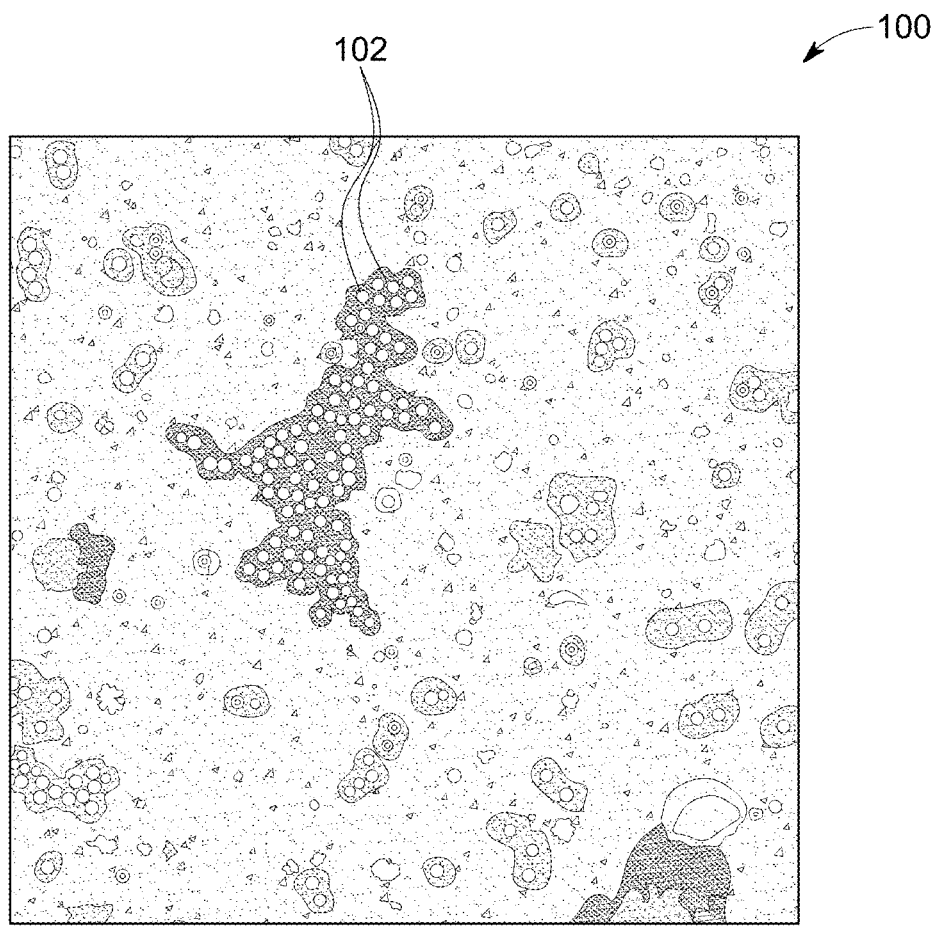
FIG. 1 is a view of virus particles in an electron micrograph.
Figure 2A:
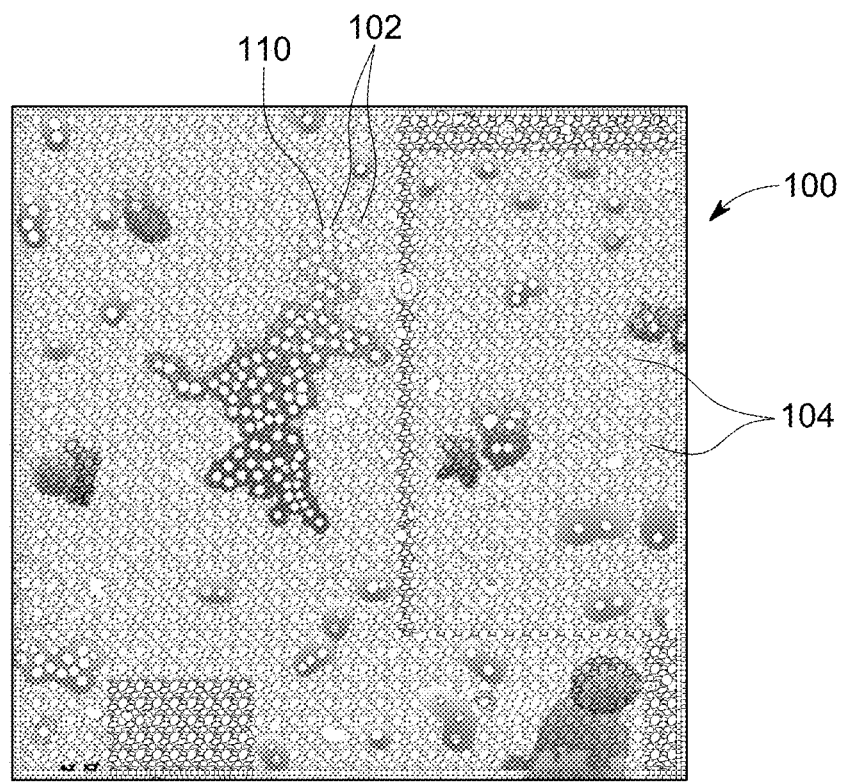
FIG. 2A is a view of the virus particles segmented at a first higher scale.
Figure 2B:
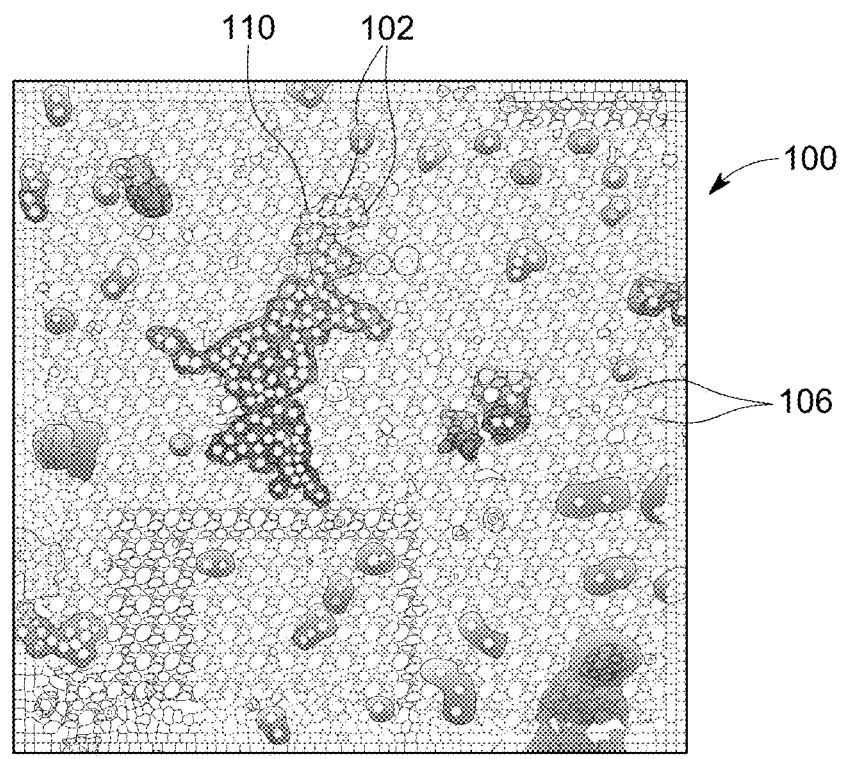
FIG. 2B is the view of FIG. 2A segmented at a second lower scale.
Figure 8:
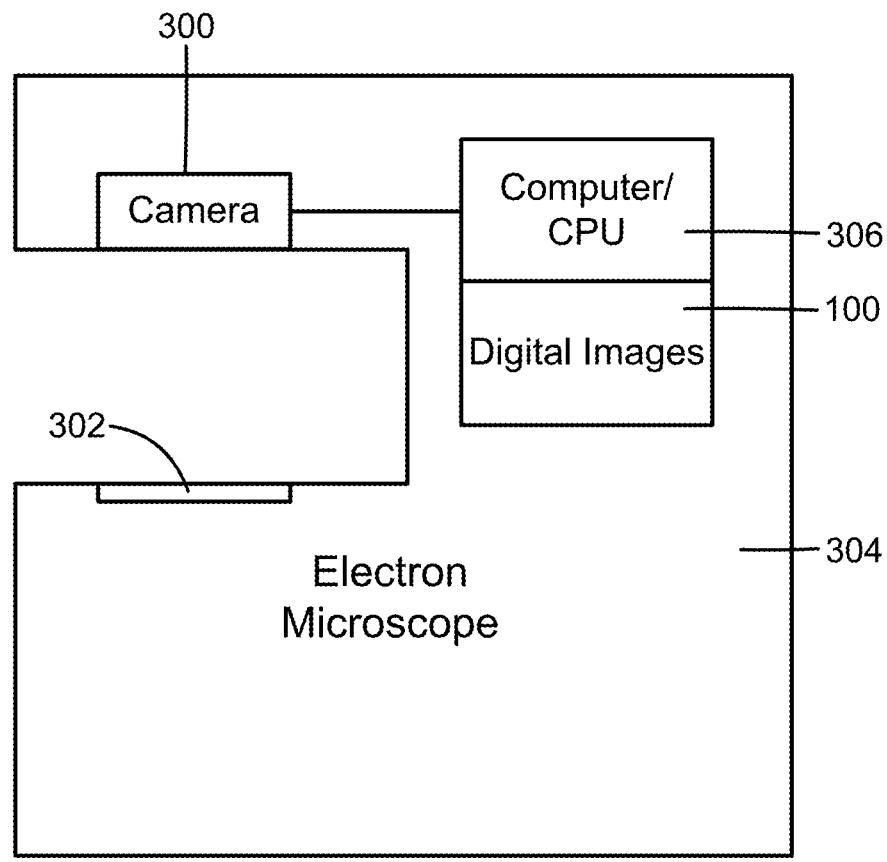
FIG. 8 is a schematic view of the electron microscope of the present invention.

In practice, a digital camera 300 (best shown in FIG. 8) is used to take a pictures or photo of an image 302 (or many images) in the electron microscope 304. The camera 300 may, of course, take many pictures of the image 302 or images. The picture is then stored in a CPU (Central Processing Unit) or computer 306 as a digital image. The digital image 100, shown in FIGS. 1-2B, is an illustrative example of a digital image stored in the computer 306. The computer or CPU 306 is then used to analyse the digital image 100 by going through each pixel of the digital image 100 to, among other things, determine the brightness of each pixel. The computer, preferably, does a mathematical transformation of objects in the digital image 100 that are used for further analysis of the image, as described in detail below.

The method for dark data portioning/segmentation and alignment is performed by investigations of the spectrum of the kernel described below:

Investigations of the Spectrum of the Kernel $$g(y,z) = \phi(c_1 d(I(y),I(z))^2 + s(z)*d(x(y),x(z))^2 + c_2 d(s(y),s(z))^2) \quad (1)$$

Over the integral equation $$(x(z), s(z)) = \left( \frac{\int g(y,z)x(y)dy}{N_x}, \frac{\int g(y,z)s(y)dy}{N_s} \right)$$

Where
(I) is the image signal,
(x) is the segmentation and alignment eigenvector,
(s) is the scaling eigenvector,
(y) and (z) are spatial index of the sampled image in the bounding box B=[0, width]×[0, height]×[0, Smax],
($N_x$) is a normalizing factor for the x eigenvector,
($N_s$) is a normalizing factor for the s eigenvector,
(d) is the standard Euclidean 2 norm,
($\phi$) is a monotonically increasing function such as the exponential function ($e^{\cdot}$),
(c1) and (c2) are weighting factors.

One key of the present innovation is the loopback of the scale (s) and the segmentation (x) in the kernel itself to generate separation. The two largest eigenfunctions of the operator (g) are used to find the fixpoints, i.e. all (y) that have the same value (x).

$$S_c = \{y \in B : X(y) = c\}$$

Each nonempty set is called segment (S) indexed by (c) or simply as ($S_c$). The set of all segments is called ($\Sigma$). The set $\Sigma$ is subject to the ontological investigation described below.

One initial step of the method of the present invention is to simultaneously identify every object in the image including the background and to divide the image into segments at different scales. Because the size of the object(s) is not known and may vary slightly due to sample preparation, instrumentation and sampling effects, all magnification scales of the microscope are first used until it has been determined which scales are the most suitable. Individual large objects, such as large virus particles, and aggregates of small virus particles may be best seen at a certain magnification. Virus particles are usually in the size range of 20 nm up to 300-400 nm. During the segmentation step, the method may be used to automatically determine which scale is the most appropriate or suitable depending on the size of the discovered object. The method of the present invention is not dependent upon a pre-set magnification scale that is, for example, set by the user. Instead, the method analyzes and determines sizes of the objects by analyzing the change of the brightness of each pixel by pixel and determines based on this analysis where the edges of the objects are and which magnification is the most optimal or suitable so that the scale used is adjusted to the size of each object found in a certain place in the image. Pixels with similar brightness (i.e. strong association) inside the edges are assumed to belong to the same object, i.e. virus particle. Instead of determining the similarity based on brightness, it is also possible to use other criteria such as similarity in color.

Pixels with a similar brightness (i.e. strong association) in the background outside the object are also assumed to belong to the background. As each pixel is analyzed in the image, a natural breaking-point is eventually found where there is a relatively weak association or similarity between the pixels such as near or at the edge of the object. As an illustrative example, pixel no. n1 has a brightness value of 5, pixel n2 has a brightness value of 5.1, pixel n3 a value of 10, pixel n4 has a value of 43, pixel n5 has a value of 50 and pixel n6 has a value of 51. The mathematical algorithm analysis determines that for pixel n3 there is a stronger association to pixel n2 than to pixel n4 because its brightness value is closer to pixel n2 than to pixel n4. For pixel n4 there is a stronger association to pixel n5 than to pixel n3 because the brightness value of pixel n4 is closer to the brightness value of pixel n5 than to pixel n3. This is where the segmentation (between pixel n3 and n4) is created because the pixels inside the segmentation line are more associated or similar to one another than to the pixels outside the segmentation and the pixels outside the segmentation are also more associated to one another than to the pixels inside the segmentation because there is less difference in brightness between each pixel inside the segmentation compared to the brightness of the pixels outside the segmentation and vice versa. If, for example, pixel n6 had a brightness value of 113 and pixel n7 had a brightness value of 115 then pixel n5 (brightness 50) would be more associated with pixel n4 (brightness 43) than to pixel 6 (brightness 113) and the segmentation would be between pixel n5 and pixel n6 i.e. pixel n5 would "follow" pixel n4 and belong to the object.

If the image has a sequence of pixels p1, p2, p3 etc., the method compares the brightness between pixel p1 and p2, between pixel p2 and p1, between pixel p2 and pixel p3, between pixel p3 and pixel p4 It determines to create a segmentation line between pixel p2 and pixel p3 when pixel p2 is more similar to pixel p1 and pixel p3 is more similar to pixel p4 than pixel p2 is similar to pixel p3.

It should thus be noted that no pre-determined threshold value is used to determine where the edge or dividing segmentation should be. In the method of the present invention, the focus is on the strongest association between the pixel values but not where there is the biggest difference in brightness. In other words, an important feature of the present invention is that the segmentation is not fixed or predetermined and the exact segmentation depends on the size of the objects in the image as determined by the associations between the pixels in the image. This means the magnification scale determined to be the most optimal (depending upon the size of the segments) could vary for each place in the image so that the method uses many scales simultaneously when analyzing the image. A certain magnification scale may be optimal to segment whole objects or clusters of objects while another magnification scale may be used to determine the association between pixels inside the object so that the image is divided into smaller segments to depict details such as the structure or shape of the virus particle and proteins attached to the virus particle. Also, as described in detail below, after the transformation of the objects in the image, the objects are normalized and objects with the same topology will look more similar to one another to make the association between the objects stronger despite variations in size and shape prior to the transformation. The same analysis of each pixel of the transformed objects and substructures at different scales is then be carried out to determine the associations. This makes the method quite insensitive to size and shape variabilities of the objects to be analyzed.

FIG. 1 illustrates a digital image 100 of virus particles 102 and other particles and debris in an electron micrograph. The digital image 100 is contains a plurality of pixels i.e. minute areas of illumination from which the image 100 is composed. FIG. 2A illustrates the image 100 divided into segments 104 at a first higher magnification scale and FIG. 2B illustrates the image divided into segments 106 at a second different and lower magnification scale. In other words, the image is simultaneously divided into segments based on local differences at different magnification scales. The separation lines between each segment 104, 106 are drawn where there is a discontinuity or change in the image such as an edge around a black continuous object (such as virus particle 102) against a gray background 110. As mentioned earlier, an important feature of the present invention is that it is not necessary to use any thresholds to create the segments. Another important principle of the present invention is the focus on associations/similarities but not on dis-similarities or differences between the objects in the segments.

Since all possible magnification scales are used, aggregates of particles (clusters), single objects and sub-parts of the objects are segmented. For example, viruses that have a dominant scale can be meaningfully segmented. Because the segmentation is performed at multiple scales, a region with a virus at a certain scale, may, in turn, also be divided into meaningful sub-segments at a finer magnification scale while the contexts or background sections of the virus particles are segmented at a coarser magnification scale. It is thus not necessary to a priori define what in the image is of interest except that each image has a magnification scale so that all objects at a particular scale is presented to the viewer of the image. It should be understood that the image also includes many segments that do not contain virus particles. The inclusion of segments that do not include any virus particles is of value for the completeness of the ontological study and may reveal non-obvious but recurrent structural appearances.

Figure 3:
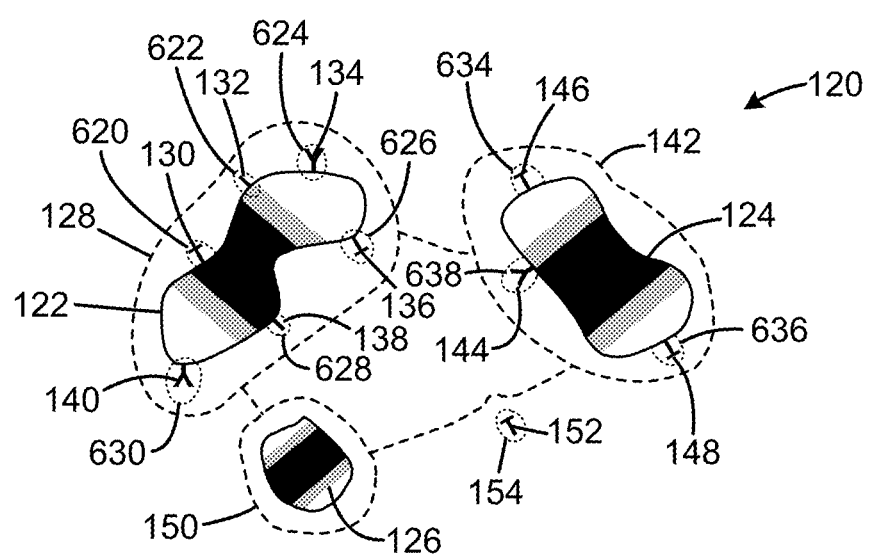
FIG. 3 is a schematic view of virus particles and sub-structures (surface proteins)

FIG. 3 is a schematic view of an image 120 at a more detailed magnification scale that shows three virus particles 122, 124, 126. The use of virus particles is merely an illustrative example to apply the principles of the present invention. The present invention is not limited to virus particles but can be applied to any object in an image. Virus particle 122 in segment 128 has surface proteins 130, 132, 134, 136, 138 and 140 attached thereto. These proteins are located inside segments 620, 622, 624, 626, 628 and 630, respectively. Preferably, the segmentation of the surface proteins is done the same way as for the virus particles but at a different scale. Virus particle 124 in segment 142 has surface proteins 144, 146 and 148 attached thereto. These proteins are located inside segments 638, 634 and 636, respectively. The third virus particle 126 in segment 150 has no protein attached thereto. Image 120 also contains a free surface protein 152 in segment 154 that is not attached to any virus particle. The protein 152 may not be seen if the magnification scale is not fine enough. By using a finer scale, the method of the present invention can take advantage of features of the sub-structures inside or outside the virus particle such as surface proteins that may be attached to the virus particles to find additional associations. The method also analyzes objects that are located between the virus particles 122, 124, 126 by analyzing and determining the brightness of each pixel in the image.

The next general step is for the mathematical algorithm of the present invention to transform, rearrange and move the identified objects disposed inside the segments into groups to make the comparison more precise. Variations in size and shape of the objects are normalized by investigating and using local alignment eigen functions determined with the same method as the segmentation.

Figure 4:
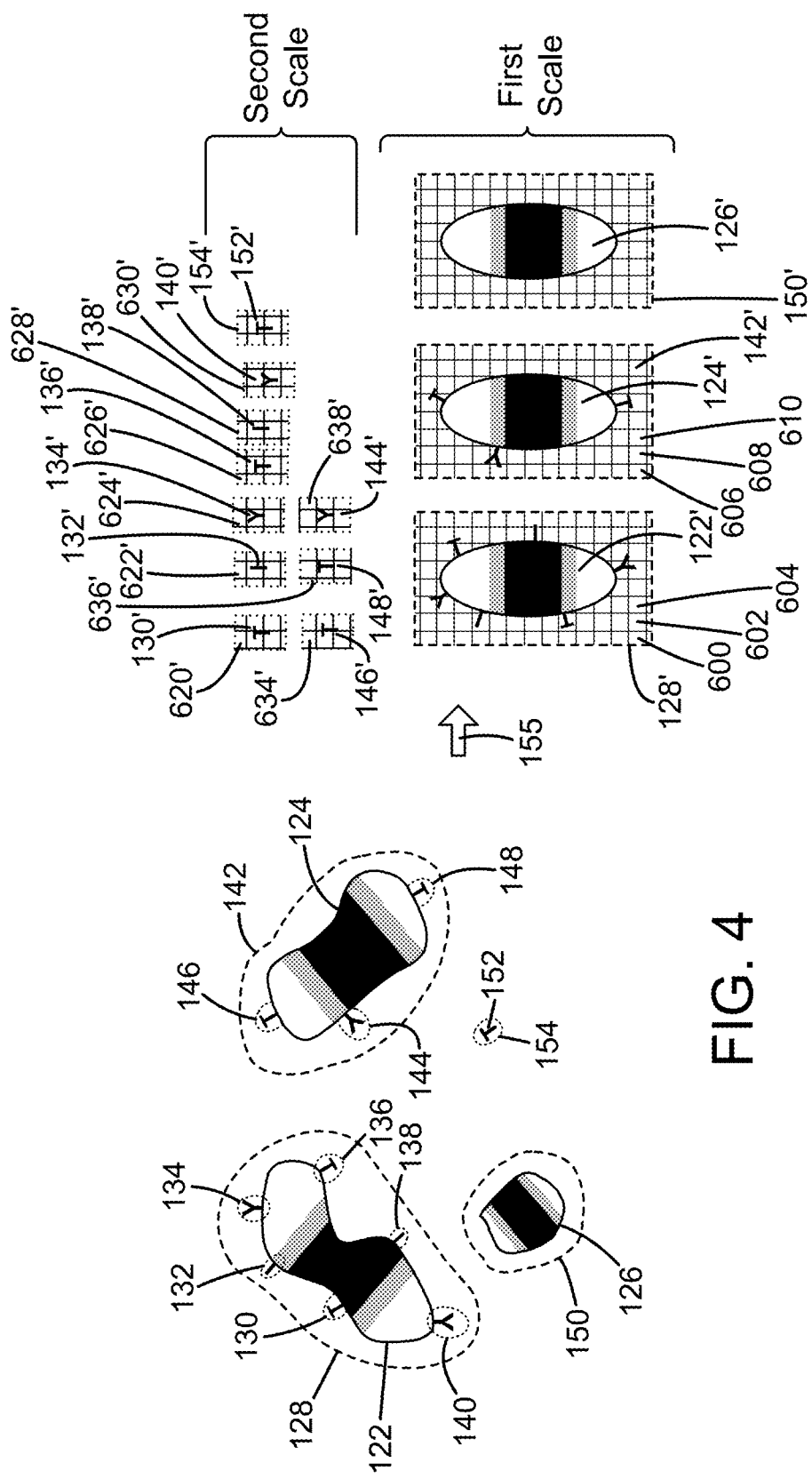
FIG. 4 is a schematic view of the virus particles and surface proteins that are independently transformed with fixed orientation.

As best shown in FIG. 4, the identified data segments 128, 142 and 150 (that contain the virus particles 122, 124, 126, respectively) are transformed and aligned into a space which normalizes for the possible arbitrariness of the signal acquisition method used. More particularly, for each identified segment, additional localized eigenfunctions are calculated and orthonormalized under polynomial factors up to level N, which gives the effect of vector fields which aligns with the structure of the image. Data segments 128, 142, 150 are transformed to segments 128', 142' and 150' that may be seen as having a new system of coordinates so that the transformed objects are aligned in the segments 128', 142' and 150'. All such transformed segments are saved for further analysis.

The segments now form a new function on the sampled image, namely I(s,x(y)) which are comparable directly under the new free variable (x). Another key of the present invention is the selection and calculation of the localized eigenfunctions in each segment which are done while still satisfying the orthogonal conditions to each other.

As schematically illustrated in FIG. 4, each segment is analyzed individually to determine the orientation of each segment and other non-linear alignments which the segment is normalized for. A feature of the present invention is that the equation/algorithm used for determining the segmentation shown in FIGS. 2A, 2B, may also be used to analyze the segments after the transformation of the image. More particularly, each segment, such as segments 128, 142, 150, is transformed to simplified shapes, as indicated by transformation arrow 155, and aligned in a common fixed orientation, as illustrated by transformed segments 128', 142' and 150'. Each and every pixel 600, 602, 604 etc. of the transformed segment 128' and all other segments are analyzed, at a first scale, to determine the brightness of the pixels. The brightness value of each pixel is then compared to the corresponding pixels 606, 608, 610 etc., respectively, of the transformed segment 142' and all other transformed segments. In other words, the brightness value of pixel 600 is compared to the brightness value of pixel 606, pixel 602 is compared to pixel 608 and so on. This comparison is quite effective because the transformed segments 128' and 142' have the same size, the same number of pixels and the transformed objects 122', 124' are aligned in the same way inside each transformed segment. This principle applies to all segments that include identified objects, sub-structures and background at all different magnification scales. It shall be noted that the transformation from basic prototype structure back to its original representation can be reversed.

The transformation and rearranging of the visual impression of the objects make it possible to compare them more precisely. Objects that have the same topology or iso-structure will, after transformation, have the same or similar shape or form and the objects are directed in the same orientation. For example, the transformed objects may get the same length and have the top and bottom aligned with one another. This is illustrated in FIG. 4 because the transformed objects 122', 124' and 126' all have virtually identical elliptical shapes and they are aligned or directed in the same way inside the segments 128', 142' and 150'. If the objects represent, for example, the same virus particle type, the transformed objects 122', 124' and 126' will also have the same topology. In this case, light section followed by dark section followed by light section. Before the transformation, a first object may have a first half segment that is brighter and a second half segment that is darker and a second object may have a first one third of the segment that is brighter and the second two third of the segment that is darker. The topology may thus include a first bright segment followed by a second dark segment. After the transformation, the algorithm will, if one dimension is used, depict the objects so that both objects have the first half being bright and the second half being dark although prior to the transformation the second object had ⅓ third bright and ⅔ dark. If the object has had a first dark segment, second bright segment and third dark segment, this would constitute a different topology.

In practice, the determination of the topology may be used to identify the objects and substructures such as virus particles and surface proteins attached to the virus particles. It should be noted that the algorithm is not limited to one dimension and that multiple dimensions are preferably used in the transformation. This applies even if the virus particles overlap one another in the image so that one virus particle is positioned slightly above another virus particle.

The transformation makes it possible to more accurately compare the transformed objects and identify additional similarities or associations that could not be seen or were very difficult to see prior to the transformation. In general, when the objects have the same topology they will look more similar after the transformation. It is also possible to analyze the "neighbors" of the objects. For example, a single object, such as a free virus particle, that is located further away from the cluster has neighboring objects that are different than the virus particles in the cluster. Although the free virus particle is very similar to the virus particles in the cluster, it most likely has a higher association to other nearby free particles than to the virus particles in the cluster. It is also possible to analyze the sub-structures of the virus particles, i.e. conduct the analysis at a higher magnification scale.

As indicated earlier, the virus particles may have surface proteins that can be analyzed to determine the level of association between the virus particles and between the surface proteins. It may not matter where on the virus particles the surface proteins are attached because the focus of the investigation is on the type and number of proteins that are attached to the virus particle. It is also possible to analyze the context or background surrounding the virus particle to strengthen or weakening the association between the virus particles in each segment.

The analysis of the transformed image is also an automated process wherein the algorithm in the computer goes through each and every pixel in the transformed segment to determine the brightness level of every pixel. There is no or very little human decisions involved about how to change the form of the virus particle or which particles should be compared to one another. As exemplified in FIG. 4, the transformation of the image of virus particle 122 in segment 128 may straighten and stretch/shorten it out to a predetermined length, as shown in the transformed virus particle 122' in segment 128'. Similarly, virus particle 124 is straightened out to virus particle 124' in segment 142' that preferably has about the same length as and is aligned with virus particle 122' so that both the top and the bottom are aligned. The same transformation is done with virus particle 126 to virus particle 126' in segment 150' that is aligned with particles 122' and 124'. The particles 122', 124', and 126' can now be compared more accurately. The particles 122, 124 and 126 have the same topology, so after the transformation, the particles 122', 124' and 126' have a very similar form or shape. The "neighbors" of the virus particles i.e. the surface proteins, are also analyzed. Similarly, the images of the surface proteins are transformed to surface proteins 130', 132', 134', 136', 148', 144', 146', 148, and 152', respectively.

It should be noted that the positions of the surface proteins that are attached to or are in close proximity to the virus particles are different. If the surface proteins had been positioned at exactly the same place on each virus particle then the surface proteins could have been included in the comparison at the first scale of each pixel between, for example, the transformed segments 128' and 142' as being part of the virus particles. However, because the surface proteins are located at different places, the method of the present invention also carries out the analysis at a second finer scale to first identify the existence of the proteins during the prior segmentation stage (without being concerned with the exact location of the surface proteins). At the finer scale such as at a second scale, the computer then goes through and compares each pixel in the transformed segments for the surface proteins and all other transformed segments at different scales to, for example, identify topologies of the surface proteins that are attached to or are in proximity to the virus particles. The transformed surface proteins are illustrated as 130', 132', 134', 136', 138', 140' and 152'. The transformed surface proteins are not yet sorted just compared to one another at a scale that is suitable for analyzing the surface proteins. Similar to the analysis of each pixel in the transformed segments 128', 142', and 150' each pixel is analyzed for the transformed segments 620', 622', 624', 626', 628', 630', 154', 634', 636' and 638' but, for example, at a higher magnification or finer scale. In this way, the brightness value of each pixel in, for example, the transformed segment 620' is compared to the brightness values of the corresponding pixels in the transformed segment 622' and all other transformed segments. In other words, the first pixel in the upper left-hand corner of transformed segment 620' is compared to the corresponding first pixel in the upper left-hand corner of the transformed segment 622' and so on until the brightness level of all pixels have been compared to all corresponding pixels in the other transformed segments. These values are saved by the computer for further analysis and to identify topologies.

An important feature of the present invention is that the rearrangement instruction is embedded in the objects themselves (i.e. the associations between the objects) so that the objects with the strongest association are, after the transformation and comparison, moved into the same group. It does not have to be specified by a human or the arrangement be optimized between each pair of images.

The principle of using automated associations between the objects at different scales and spatial proximity is described below. A first magnification scale could be suitable for analyzing a cluster of virus particles, a second magnification scale could be most suitable for analyzing individual virus particles while a third magnification scale could be suitable for analyzing sub-structures within and outside the virus particles. Recurrent objects at different scales are identified as groups which give the user an understanding which magnification scales that are of interest for a certain analysis.

The inventive method for automated association of the data segments at different scales and spatial proximity may mathematically be described, as shown below. The extracted segments are placed in a finite graph with the associativity kernel.

$$g_2(c1, c2) = \phi\left(k_1 d_s(c_1, c_2) + k_2 \sum_{a \in n_{c1}} \min_{b \in n_{c2}} \|p_a - p_b\|^2\right)$$

Where the distance $d_s$ between two transformed segments are the standard $L^2$ norm of the difference of the functions, and neighboring segments are denoted by $(n_{c1})$ and $(n_{c2})$. The eigenvectors for this kernel are orthonormalized up to a polynomial level of 3 and subject for clustering. The added eigen vector point for a segment (S) is called (p).

Figure 5:
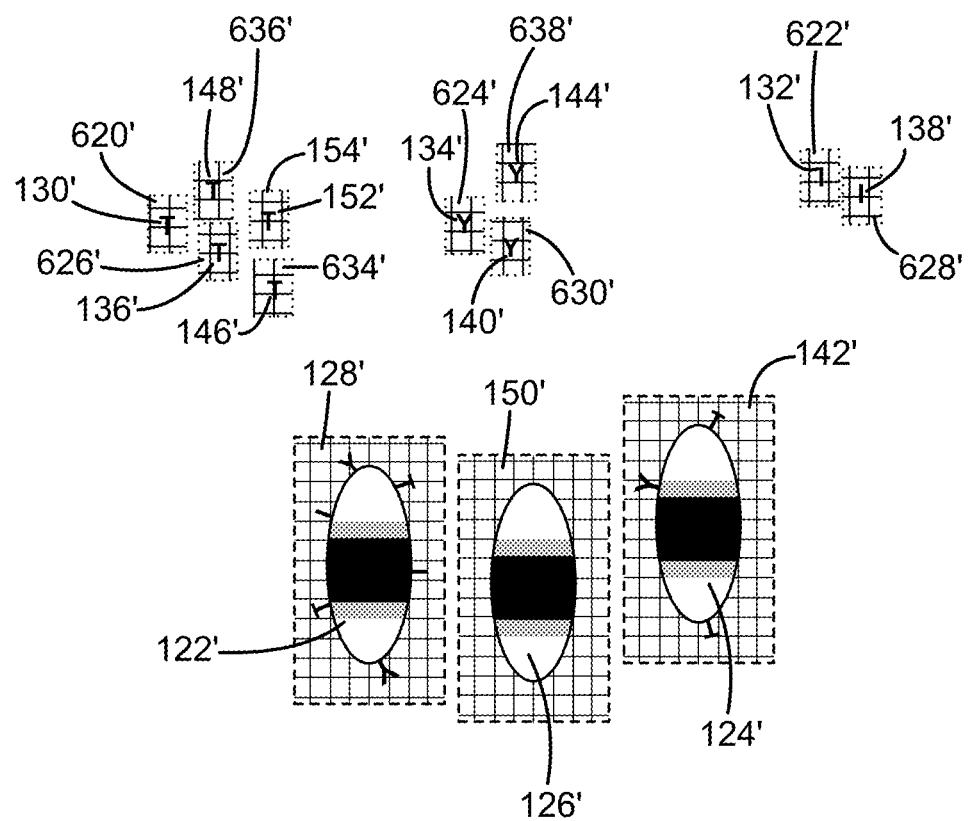
FIG. 5 is a schematic view of groups of transformed virus particles and sub-structures.

As shown in FIG. 5, the transformed objects, such as the virus particles, other sub-structures and background segments with a high association to each other are grouped together. As described above, the brightness value each pixel in the transformed segments are compared to each corresponding pixel in all other transformed segments. In general, transformed objects, inside the transformed segments, that are similar to other transformed objects are moved closer to one another or grouped together.

In other words, at a first scale, the pixel values for each transformed segment such as segments 122', 150' and 142' in FIG. 5 are compared to each other and all other segments so that the pixel values in one transformed segment is compared to the pixel values in the other transformed segment to identify similar or the same topologies. The segments with the highest association or similarity are grouped together. The computer assigns each transformed segment with a space coordinate so that similar transformed segments are given space coordinates that are similar and therefore the transformed segments are moved closer to one another. At a second scale that is finer than the first scale, the pixel values for every segment of the transformed segments are compared to one another so that transformed protein images that have the same topology are grouped together, as shown in FIG. 5. In other words, the transformed objects that have the highest association are moved to be the closest to one another in the group. Preferably, the grouping is thus done at different scales. The segments analyzed may not necessarily be from the same image. The transformed particles 122', 124' and 126' are grouped together because they have a higher association to one another, i.e. the same or similar topology, than to other objects in the image. Similarly, surface proteins 130', 136', 146', 148' and 152' (illustrated as "T-proteins") are grouped together because they have the same or similar topology, surface proteins 134', 140' and 144' (illustrated Y-proteins) are grouped together and surface proteins 132' and 138' (illustrated as I-proteins) are grouped together. All transformed segments are compared to one another. This means, for example, that the pixels in the transformed segment 128' is compared to the pixels in the transformed segment 620' (that contains transformed surface protein 130') and because the topologies are quite different the space coordinates assigned to these two segments by the computer are quite different. Therefore, the segment 620' is quite far away from segment 128' in FIG. 5.

Figure 6:
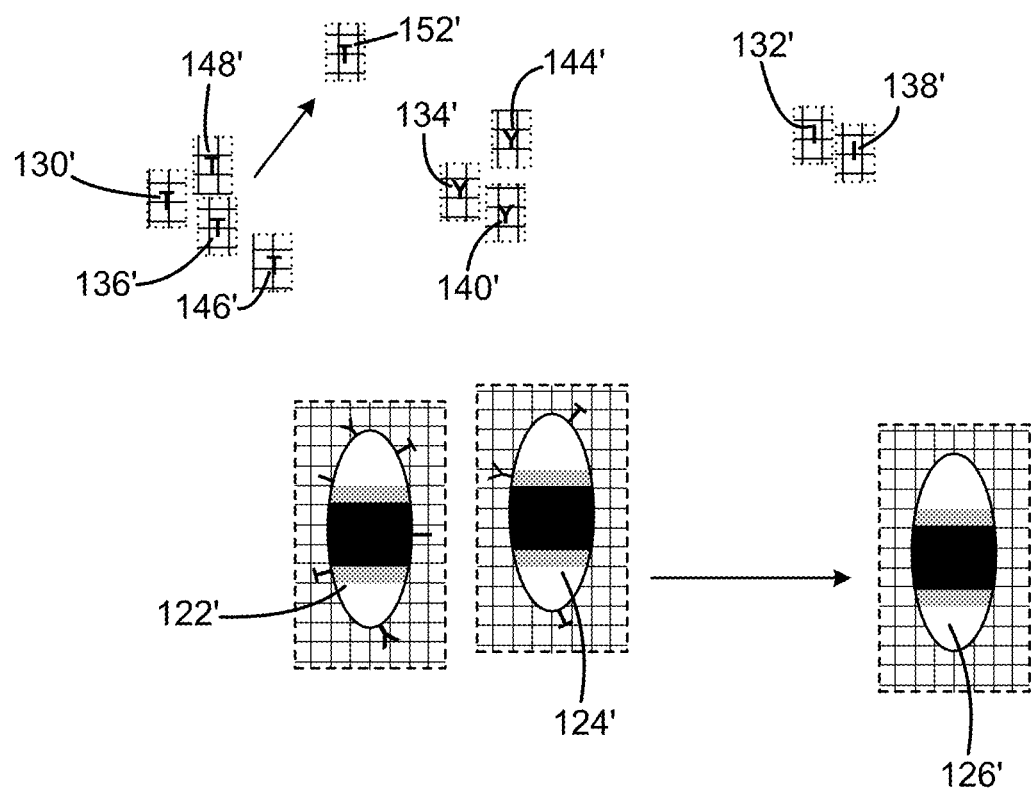
FIG. 6 is a schematic view of additional associations of the objects within the groups.

As explained below, each segment of similar objects in the grouping may then be analyzed at a higher association scale to identify additional and more detailed/specific associations, as illustrated in FIG. 6, that creates ontological tree-structures. In FIG. 5, the segments are organized and sorted into groups based on whether the segments include objects or structures with similar or the same topologies. For example, virus particles are associated or grouped together because each segment includes a virus particle. Also, similar surface proteins are grouped together based on a direct comparison. However, neighboring segments may contain additional information that make them into a new recurrent combination of segments. In FIG. 6, the segments are compared to one another to determine whether the segments have any common pixels in the pre-transformation view (see FIG. 3) in order to find additional associations. A "neighbor" may be defined as a segment containing a sub-structure that simultaneously shares the same area as a segment that contains a virus particle, i.e. the segment of the sub-structure is located inside the segment for the virus particle so that the virus particle segment encompasses the segment of the surface protein, as shown in FIG. 3. The same area means that the two segments in FIG. 3 have at least one pixel simultaneously in common in a two-dimensional view such as in the xy-plane. The method thus determines whether two segments are neighbors or not by determining whether the two segments have at least one pixel in common. It does not determine the exact position of the surface protein or virus particle within the segment of the virus particle. It merely focuses on whether there are common pixel areas for the two segments. As indicated above, the pixel information used for the segmentation, as shown in FIG. 3, is saved in a database for retrieval in order to analyze whether two segments are neighbors or not. It should be noted that the virus particles may be analyzed at a first scale while sub-structures (i.e. surface proteins) are analyzed at the second finer scale. If the magnification scale is treated as a third dimension, and two virus particles are at the same magnification scale, then the two virus particles may be treated as neighbors as seen in the plane of the scale although they may not be neighbors in the xy-plane. Two segments can thus be spatially neighbors or neighbors because the segments are analyzed at the same magnification scale.

FIG. 6 illustrates the idea that the existence of fine scale surface proteins and their individual association provides additional information to the association of the complex virus particles 122', 124' and 126'. The computer now analyzes the neighbors to the virus particles i.e. sub-structures that were identified during the segmentation stage inside each virus particle segment so that the segments of the sub-structures share at least one pixel with the segment of the virus particle. As explained in FIG. 3, several segments that contain surface proteins share the same area as some of the segments that contain virus particles i.e. segments that contain surface proteins are located inside the segment of the virus particles. Instead of merely comparing each pixel of the transformed segments with one another, as illustrated in FIG. 5, the segments (containing substructures i.e. surface proteins) that share the same area as the segment containing a virus particle is compared to segments (that contain substructures) that share the same area as the segment of another virus particle. In this way, segments of surface proteins that share areas/pixels with other segments, such as segments that contain a virus particle, are analyzed. The exact position of the sub-structure segment inside the larger segment is not analyzed or determined. There is, for example, a stronger association between the transformed virus particles 122' and 124' that each has surface proteins as neighbors inside the transformed segments 128', 142', respectively, compared to the association with the transformed virus particle 126' that does not have any surface proteins disposed inside its transformed segment 150', i.e. no segment that contained a surface protein was located inside segment 150 surrounding virus particle 126 in FIG. 3. The transformed segments 128' and 142' are therefore assigned new more precise space coordinates by the computer so that they are moved closer to one another than the space coordinate assigned to transformed segment 150' (that contains virus particle 126') is to transformed segments 128', 142'.

Similarly, the existence of virus particles as neighbors to the surface proteins provides additional information to the association between the surface proteins so that this provides a stronger association of surface proteins that are attached to a virus particle than "free" surface proteins that are not attached to any virus particle. More particularly, the transformed segment 154' (that contains the transformed surface protein 152') does not share an area with a segment that contains a virus particle. Surface protein 152' is a "free" surface protein that is not attached to a virus particle while the segments that contain the surface proteins 130', 136', 144' and 146' all share an area with segments that each contain a virus particle and there is therefore a higher association between the segments of these surface proteins than the segment 154' containing only the free protein 152'. In other words, at different perceptual scales, the segments can thus be sorted and divided into sets in a "perceptual" space. Each set of segments can be further divided into subsets if some of the segments have a stronger association to one another than to other segments. An important aspect of the present invention is that the association is inclusive with no selection of differentiating properties but only inclusive properties. The only separating property is the global normalization forcing the data points to spread over the unit ball.

The method for automated hypothesis testing of associative clusters is described below. The method starts at a low scale handled by (c1) and (c2) (see equations above), where the kernel only has one fix point. Incrementally moving towards a higher magnification scale where all segments are unique and a separated cluster around a segment (S) is evaluated by using balls around the segments. A cluster is identified if:

$$\{x \in \Sigma, x : r < \|p_s - p_x\| < 2r\} = \emptyset \text{ for some } (r).$$

Additionally, the same shall hold for each interior point in $I = \{x \in \Sigma, x : \|p_s - p_x\| < r\}$ of the potential cluster with the radius $(r)$, i.e. $\forall i \in I : \{x \in \Sigma, x : r < \|p_i - p_x\| < 2r\} = \emptyset$, identifying a local uniqueness of the proposed cluster. The cluster shall not be empty and there should be a non-empty set of exterior points (located at >2r distance).

This is thus an automated way that does not require any assumptions of the data to sort the data into separable classes. The present invention thus enables automated computation of the association of objects and the ontological investigation of many objects with each other in a timely and energy efficient manner without having to make elaborate assumptions which is the case when using pre-defined filters and without having to optimize a set of parameters when comparing two objects.

Figure 7:
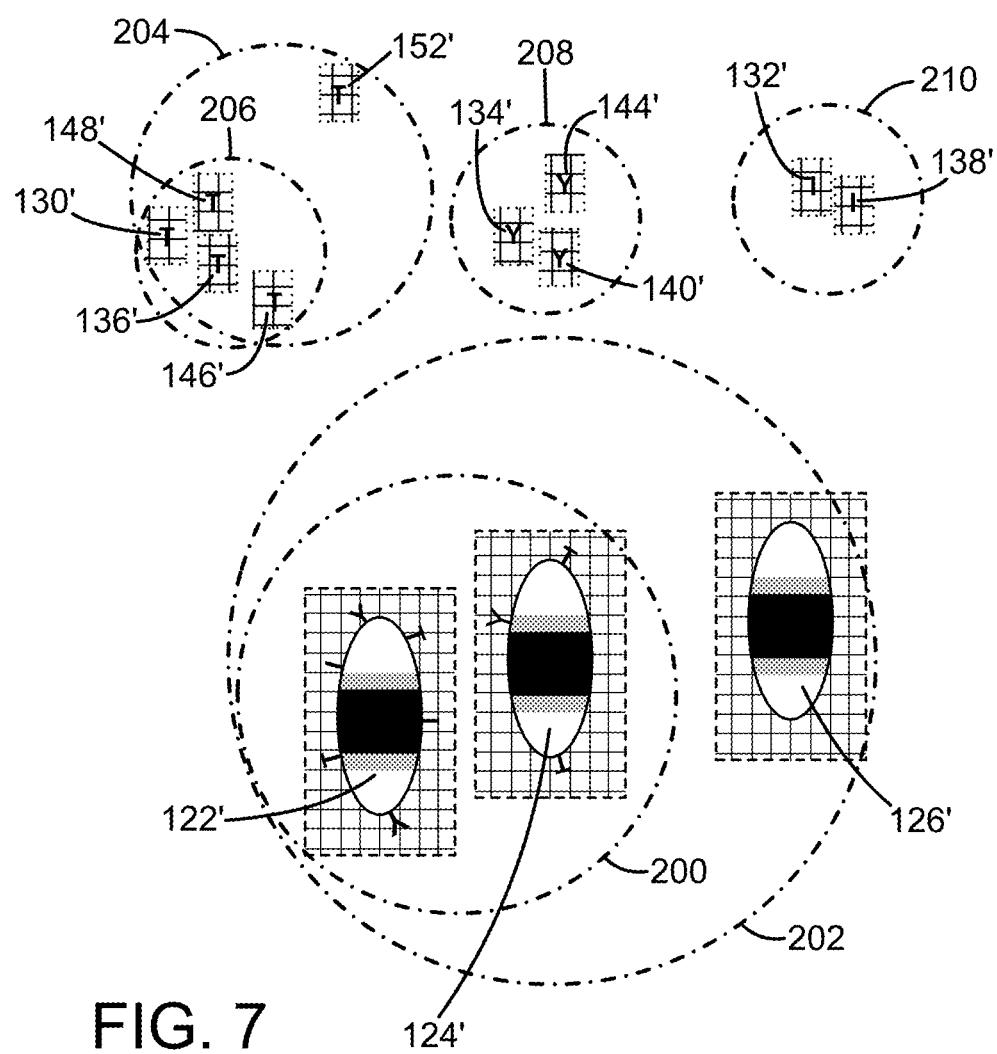
FIG. 7 is a schematic view of the clustering within the groups based on the association between the objects in the groups.

FIG. 7 schematically illustrates how virus particles and surface proteins are clustered into groups (as outlined with dashed/dotted circles) based on if the grouping is significant as determined by a measurement of the association. The separation of a set into sub-sets may take place when a subset of structures is located at significant distance to all other points in the subset. For example, the virus particle 126' that contains no surface proteins is located further away in the "perceptual" space from the two virus particles 122' and 124' that both contain surface proteins compared to the distance between the two virus particles 122' and 124' (that contain surface proteins). However, virus particles 122', 124' and 126' are clustered into group 200 of virus particles while only virus particles 122' and 124' are clustered into the group 202 of virus particles that have surface proteins attached thereto. Similarly, the surface proteins 130', 136', 144', 146' and 152' are clustered into the group 204 of "T" proteins. Only surface proteins 130', 136', 144' and 146' are clustered into group 206 of "T" proteins that are attached to a virus particle. Surface proteins 134', 140' and 148' are clustered into group 208 for "Y" proteins while surface proteins 132' and 138' are clustered into group 210 for "I" proteins.

The clustering described in FIG. 7 is similar to the segmentation step illustrated in FIG. 3 wherein objects and sub-structures that have the highest association (based, for example, on topology and neighbor criteria) are clustered into a common cluster or significant/distinct groups so that the closer the segments are positioned in the sorting space (based on the coordinates and eigen vectors) the higher the association is between them. Distinct groups may be groups that are far away from one another in the coordinate system and there are no or very few objects/structures between the groups.

Figure 9:
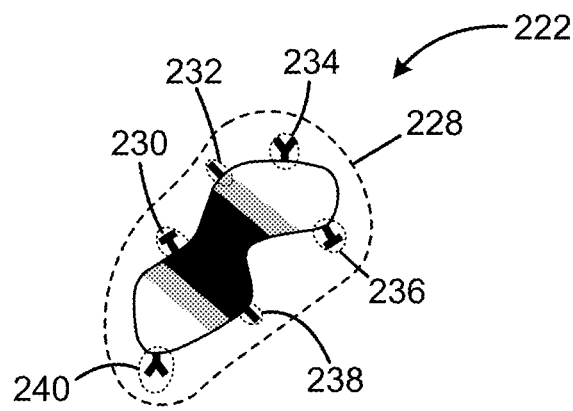
FIG. 9 is a schematic view of a virus particle.
Figure 10:
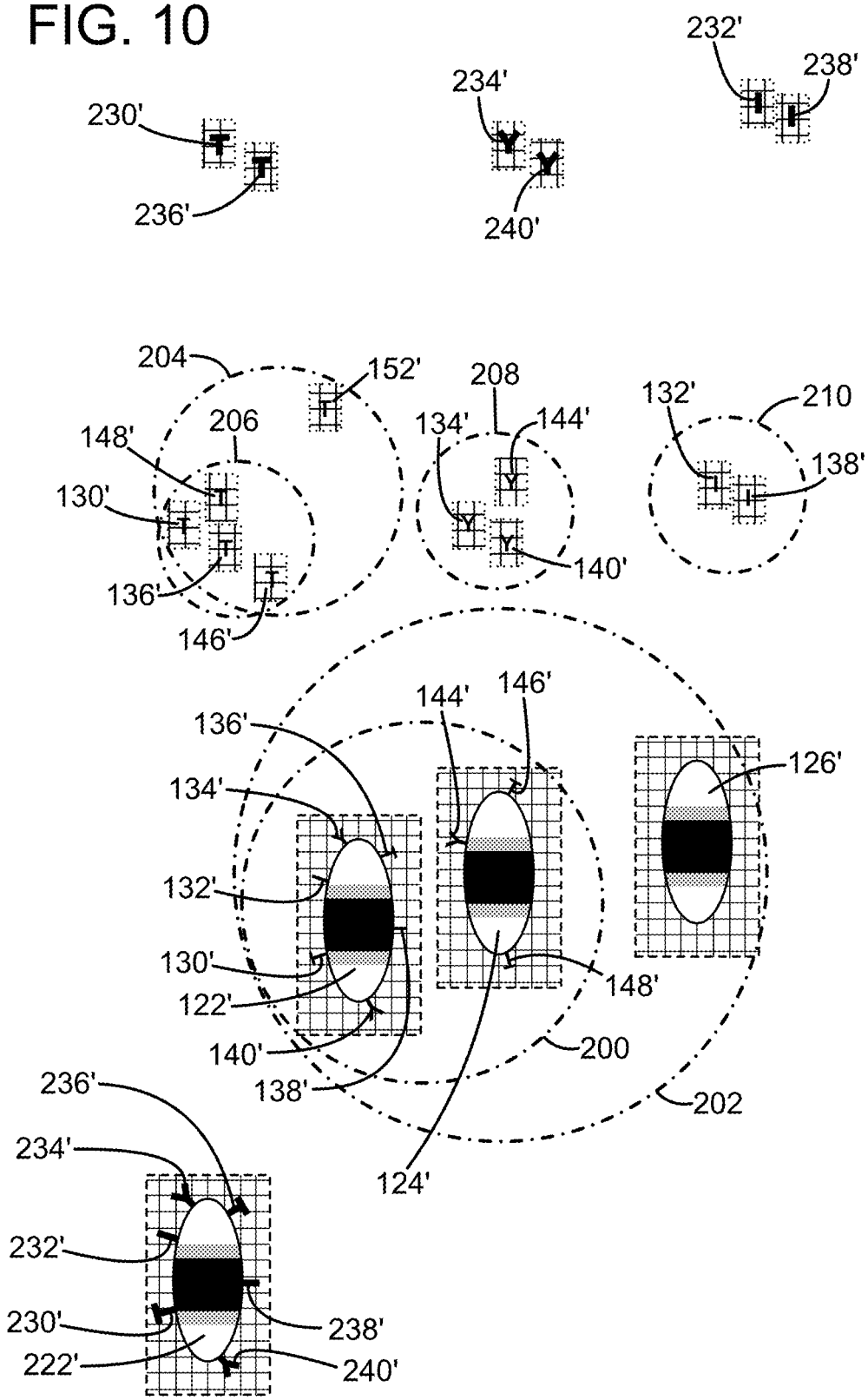
FIG. 10 is a schematic view of group clustering where relationships are measured.
Figure 11:
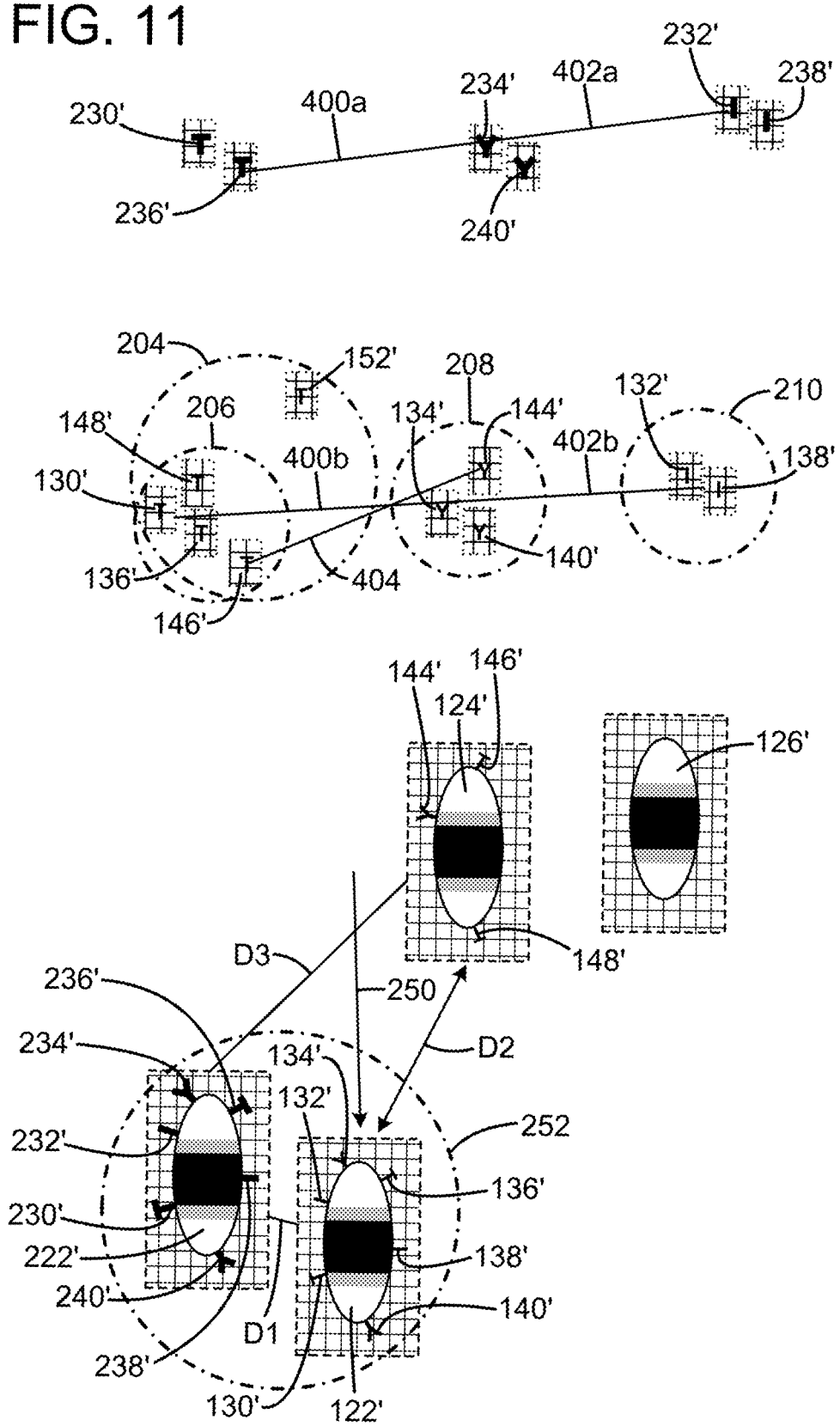
FIG. 11 is another schematic view of group clustering where relationships are measured.

The associative kernel $g_2$ can be complemented with additional terms of association between segments and groups of segments. With reference to FIGS. 9-11, the relationship between a segment with two selected neighbor segments can be compared with the relationship between another segment with two selected neighbor segments. Such a relationship comparison is selected to be a triangle inequality measurement of the distances between the three objects in the groups (i.e. the segment and the two neighbors). Two segments that have a similar triangle inequality relationship with neighbors have a high association. A real-world example of such a cognitive comparison is the relationship between the electron and atom core in the context of an atom compared to the relationship between the earth and sun in the context of the solar system. In both systems there is, for example, a central object around which smaller objects move in an oval or circular path so the relationship or interactions between the components in both systems are similar.

Two identified clusters can undergo the same local arrangement as has already been described. The distribution of the segment positions in each local cluster describes the local morphological geometry of a segment group. This morphological geometry can be compared between two clusters of segments in order to group clusters depending on their group behavior. A morphological geometry is, for example, the variation of an object viewed from different positions, or a small but continuous variation of the topology of the object. One way to compare two distributions is, preferably, based on the sum of the smallest distances between the points in each cluster.

More particularly, FIG. 9 shows an object such as a virus particle 222 in segment 228 that is substantially similar to the virus particle 122 shown in FIGS. 3-4. Although particle 222 resembles particle 122, the details or sub-structures attached to the particles are all different or very different from the ones in particle 122 but the relationship between the details remains the same or very similar. For simplicity, the terms details, sub-structure and surface-proteins are herein used interchangeably.

Surface proteins 230, 232, 234, 236, 238 and 240 are different from surface proteins 130, 132, 134, 136, 138 and 140 of particle 122 but the relationships between the surface proteins are similar or the same such as the relative position of the surface proteins relative to other surface proteins. It should be understood that the details 230-240 do not have to be surface proteins and can be any object that is different from details 130-140. It should also be understood that the location of the details 230-240 on the particle 222 does not have to be the same as location of the surface proteins 130-140 are located on particle 122 because it is the relationship between the details or surface proteins that is of most interest. If, in the above example, the details 230-240 and details 130-140 turn out to also be located in the same position of each particle, respectively, this further strengthen the similarity of how the details relate to one another. It is to be understood that the exact spatial position of the details 130-140, 230-240 on each respective particle 122, 222 is not the primary focus. Instead, the primary focus may be on how one surface protein is positioned relative to another surface protein without exactly knowing where on the particle the surface proteins are attached. For example, the Y-detail 234' has an I-detail 232' to the left and a T-detail 236' to the right thereof which is similar to the Y-detail 134' that has an I-detail 132' to the left thereof and a T-detail 136' to the right of the Y-detail 134' also, as shown in FIGS. 10-11.

It may be also possible that the details 230-240 are also surface proteins that are the same as details 130-140 but that the details 230-240 have additional secondary surface proteins attached to the surface proteins that are similar to surface proteins 130-140. This makes surface proteins 230-240 different from the surface proteins 130-140 but they relate to one another and to the main particle/virus in the same way so the constellations of virus particles and surface proteins attached thereto relate to one another in a similar or the same way.

The novel concept of the triangle inequality comparison of the present invention measures this resemblance and particle 222 and particle 122 are determined to be more strongly associated with one another than particle 122 is to particle 124 (that was shown in FIGS. 3-4) even though particle 122 and particle 124 share some details, i.e. the same surface proteins. In other words, there are "direct similarities" between particle 122 and 124 because they contain the same surface proteins T-surface proteins and Y-surface proteins. However, the identification of direct similarities between objects can be very cumbersome because so many tests of the characteristics of objects must be conducted. In the triangle inequality comparison, the focus is not on the direct similarities between the details (i.e. surface proteins) of the particles but more on how the details are related to one another or how the details interact with one another to find or identify relationships that the details have in common even if the details are not similar when directly compared to one another. For example, the relationship between surface proteins that are attached to a virus particle in a certain context can thus be transferred to other surface proteins that are also attached to a virus particle in a different context to identify common relationships in both contexts.

More particularly, proteins 130, 136 of particle 122 are the same as proteins 146, 148 of particle 124 and surface proteins 134, 140 of particle 122 are the same type as surface protein 144 of particle 124. However, the relationship between the surface proteins are different for particle 124 compared to particle 122. Also, particle 124 completely lacks surface proteins that are the same as surface proteins 132, 136 of particle 122. For example, particle 124 does not have the "I" details. This is visualized in FIGS. 10-11 (that are analogous to illustrated transition in FIGS. 4-5).

FIG. 10 is substantially similar to FIG. 7 but transformed particle 222' and its details 230'-240' have been added to carry out the triangle inequality comparison with particles 122' and 124'. Closeness or proximity in FIG. 10 represents similarity between the objects. As best shown in FIG. 11, line 400a represents how the transformed detail 236' relates to transformed detail 234' of transformed particle 222'. For example, the length, position and direction of line 400a may be an indication of this relationship so that geometry is used to illustrate how the details relate to one another. Other characteristics of the line may also be used. Similarly, line 402a represents how the transformed detail 234' relates to the transformed detail 232'. Line 400b represents how the transformed detail (such as surface protein) 136' relates to the transformed detail 134' of transformed particle 122' and line 402b how the transformed detail 134' relates to the transformed detail 132' of the transformed particle 122'. It could have been possible to illustrate the relationship between detail 236' and detail 238' by extending another line directly from detail 236' and 238' so that lines 400a, 400b, and the new line together form a triangle. In this case, because lines 400a and 402a together form a straight line which means that the distance between detail 236' and detail 234' plus the distance between detail 234' and detail 232' is the same as the distance between detail 236' and detail 232' and that the three lines form a triangle that does not have a height and the line between detail 236' and detail 232' is the same as line 400a plus line 402a. The distance between detail 236' and detail 232' could have been shorter and the lines 400a and 402a would not form a straight line but that an angle is formed therebetween then the three lines would have formed a visible triangle that has a height. Line 404 represents how the transformed detail 146' of the transformed particle 124' (which is different from particle 122') relates to transformed detail 144' of the same particle 124'. As can be seen, line 400a is substantially similar to line 400b and has about the same length and direction this means the relationship between detail 236' and detail 234' (as represented by line 400a) is substantially similar to how detail 136' relates to detail 134' (as represented by line 400b). Line 404, on the other hand, has a length and direction that is more different than line 400a is to line 400b so even if particle 124' would have had I-details the formed triangle would be different from the triangle formed between detail 236'-234'-232' (a triangle without a height) and 136'-134'-132' (also a triangle without a height that is congruent with the 236'-234'-232' triangle above). The length and direction of the lines are affected by all the details in the context so if, for example, details 232' and 238' did not exist, particle 222' may have been more similar to particle 124' instead of being more similar to particle 122'.

Because particle 122' and the details or surface proteins 130'-140' attached thereto are more similar to particle 222' and the details or surface proteins 230'-240' attached thereto than particle 122' (including details 130'-140') is to particle 124' (including details 134', 140' and 144'), particle 122' is moved closer, as illustrated by arrow 250, to particle 222' to form a group cluster 252 so that the particle 222' constellation is closer to particle 122' constellation than particle constellation 124' is to particle constellation 222'. The triangle inequality measurement between the particle 222', 122' and 124' constellations is such that the distance D1 between particles 222' and 122 is the shortest while the distances D2, D3 from particle 122' to particle 124' and from particle 222' to particle 124', respectively, are longer, as shown at the bottom of FIG. 11.

While the present invention has been described in accordance with preferred compositions and embodiments, it is to be understood that certain substitutions and alterations may be made thereto without departing from the spirit and scope of the following claims.

I claim:

1. A method for automated ontological grouping of objects, comprising:
   a digital camera taking a picture of an image in an electron microscope;
   storing the picture as a digital image in a computer;
   the digital image having pixels in sequence having brightness values comprising a first pixel having a first brightness value, a second pixel, adjacent to the first pixel, having a second brightness value, a third pixel, adjacent to the second pixel, having a third brightness value and a fourth pixel, adjacent to the third pixel, having a fourth brightness value,
   the digital image also having a fifth pixel having a fifth brightness value, a sixth pixel, adjacent to the fifth pixel, having a sixth brightness value, a seventh pixel, adjacent to the sixth pixel, having a seventh brightness value and an eighth pixel, adjacent to the seventh pixel, having an eighth brightness value,
   the computer automatically determining, by simultaneously using all possible magnification scales of the electron microscope, a degree of association between the pixels by comparing the first brightness value with the second brightness value, the second brightness value with the third brightness value, the third brightness value with the fourth brightness value, the computer also comparing the fifth brightness value with the sixth brightness value, the sixth brightness value with the seventh brightness value, the seventh brightness value with the eighth brightness value;
   the computer forming a first segment around a first identified object between the second pixel and the third pixel when the second brightness value is more similar to the first brightness value than the second brightness value is to the third brightness value and when the third brightness value is more similar to the fourth brightness value than the third brightness value is to the second brightness value;
   simultaneously with forming the first segment, the computer forming a second segment around a second identified object in the digital image between the sixth pixel and the fifth pixel when the sixth brightness value is more similar to the fifth brightness value than the sixth brightness value is to the seventh brightness value and when the seventh brightness value is more similar to the eighth brightness value than the seventh brightness value is to the sixth brightness value;
   the computer mathematically transforming the first identified object to a first transformed object in a first transformed segment and the second identified object to a second transformed object in a second transformed segment wherein the transformed first and second objects have aligned shapes with a fixed orientation;
   based on the brightness of the pixels, the computer determining a first topology of the transformed first object and a second topology of the second object by comparing brightness of pixels in the first transformed segment with brightness of corresponding pixels in the second transformed segment; and
   the computer assigning space coordinates to the first transformed object and the second transformed object based on identified topologies so that the first transformed object is moved proximate to the second transformed object when the first topology is similar to the second topology and remote from the second transformed object when the first topology is different from the second topology.

2. The method of claim 1, wherein the method further comprises the steps of at a second magnification scale, the second magnification scale being at a higher magnification than a first magnification scale, the computer automatically identifying sub-structures in the digital image by comparing brightness of pixels in the digital image; the computer determining a degree of association between each pixel based on the brightness of each pixel;
   the computer forming a first sub-structure segment around a first identified sub-structure and a second sub-structure segment around a second identified sub-structure in the digital image where the pixels have a lowest association to one another;
   the computer mathematically transforming the first identified sub-structure to a first transformed sub-structure in a first transformed sub-structure segment and the second identified sub-structure to a second transformed sub-structure in a second transformed sub-structure segment wherein the transformed first and second sub-structures have shapes with a fixed orientation;

based on the brightness of the pixels, the computer determining a second topology of the transformed first sub-structure; and the computer comparing brightness of pixels in the first transformed sub-structure segment with brightness of pixels in the second transformed sub-structure segment.

3. The method of claim 2, wherein the method further comprises the steps of the computer determining a topology of the second transformed sub-structure, based on the topology of the second transformed sub-structure, the computer assigning space coordinates to the first transformed sub-structure and the second transformed sub-structure so that the first transformed sub-structure and the second transformed sub-structure are in proximity in a perceptual space but remote from the first and second transformed objects.

4. The method of claim 3, wherein the method further comprises the steps of the computer identifying a third object and forming a third segment around the third object, determining that the first segment and the first sub-structure segment have a pixel in common and that the second segment and the second sub-structure have a pixel in common, the computer determining that the third segment has no pixel in common with a first and second sub-structures, the computer assigning space coordinates to the first and second segments so that the first and second segments are closer to one another in the perceptual space than the third segment is to the first and second segments.

5. The method of claim 3, wherein the method further comprises the steps of identifying the third object in a second digital image.

6. The method of claim 2, wherein the method further comprises the steps of the computer identifying objects at the first magnification scale simultaneously with identifying sub-structures at the second magnification scale.

* * * * *